(12) United States Patent
Lüken et al.

(10) Patent No.: US 7,610,717 B2
(45) Date of Patent: Nov. 3, 2009

(54) FLOWER POT

(75) Inventors: Reinhard Lüken, Dwergte (DE); Alfons Sieverding, Lohne-Brockdrf (DE)

(73) Assignee: Gebr. Poeppelmann Kunststoffwek-Werkzeugbau, Lohne (DE)

( * ) Notice: Subject to any disclaimer, the term of this patent is extended or adjusted under 35 U.S.C. 154(b) by 184 days.

(21) Appl. No.: 10/487,650

(22) PCT Filed: Jul. 27, 2002

(86) PCT No.: PCT/EP02/08406

§ 371 (c)(1),
(2), (4) Date: Apr. 7, 2005

(87) PCT Pub. No.: WO03/020086

PCT Pub. Date: Mar. 13, 2003

(65) Prior Publication Data
US 2006/0059776 A1 Mar. 23, 2006

(30) Foreign Application Priority Data
Aug. 30, 2001 (DE) ................. 201 14 322

(51) Int. Cl.
A47G 7/02 (2006.01)

(52) U.S. Cl. ................. 47/67; 47/65; 47/65.5; 47/83; 47/66.6; 24/457; 24/555; 248/328; 248/100

(58) Field of Classification Search .......... 47/67, 47/65, 65.5, 83, 66.6; 248/317, 318, 320, 248/322, 339, 328, 100, 359; D11/143, 144, D11/152, 153; D6/566, 556; 24/457, 458, 24/555; A47G 7/00
See application file for complete search history.

(56) References Cited

U.S. PATENT DOCUMENTS

| | | | | |
|---|---|---|---|---|
| 1,756,461 A * | 4/1930 | Hanson | ......................... | 47/67 |
| 3,981,099 A * | 9/1976 | Dziewulski | .................... | 47/67 |
| D241,764 S * | 10/1976 | Gottsegen | .................. | D11/152 |
| D241,796 S * | 10/1976 | Bartlett | ...................... | D11/148 |
| D274,583 S * | 7/1984 | Lafferty | ..................... | D11/148 |
| 4,630,795 A * | 12/1986 | Kagan | ......................... | 248/318 |
| 4,744,171 A * | 5/1988 | Hilliard | ......................... | 47/67 |

(Continued)

FOREIGN PATENT DOCUMENTS

DE 2913906 * 4/1979

(Continued)

*Primary Examiner*—Andrea M Valenti
(74) *Attorney, Agent, or Firm*—Porter, Wright, Morris & Arhur, LLP

(57) ABSTRACT

The invention relates to a flower pot (1) made of deep drawn plastic material and provided for a hanging flower pot wherein a suspension part (2) comprises a plurality of strands (5) that are linked via hook clips (3) with the pot rim (4) that has an outer continuous contour. The aim of the invention is to provide a flower pot that, in accordance with the special technical conditions during the deep drawing, is provided with a fixation of the seat (7) of the hook clips (3), while maintaining a good distribution of suspension loads between the pot and the hook clips and safeguarding an appealing yet easy to handle shape. To achieve this aim, the pot rim (4) has tapered sections extending inwards towards a wall contiguous with the bottom. These tapered sections form a seat (7) for the hook clips (3).

19 Claims, 3 Drawing Sheets

U.S. PATENT DOCUMENTS

Figure 1:
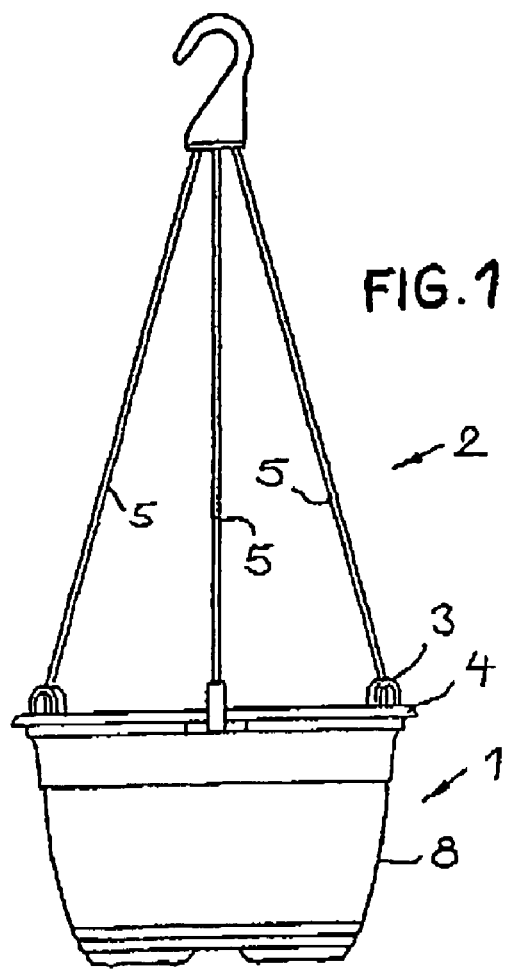

| | | | |
|---|---|---|---|
| 5,329,728 A * | 7/1994 | Ray | 47/67 |
| 5,779,210 A * | 7/1998 | Canson et al. | 248/318 |
| D405,386 S * | 2/1999 | Ross | D11/152 |
| 5,941,019 A * | 8/1999 | Guarriello et al. | 47/66.6 |
| 2006/0289711 A1 * | 12/2006 | Wilschut et al. | 248/309.1 |

FOREIGN PATENT DOCUMENTS

| | | | |
|---|---|---|---|
| EP | 0047015 | * | 10/1982 |
| EP | 0210702 | * | 7/1986 |
| EP | 1092343 A2 | * | 4/2001 |
| FR | 2781201 A1 | * | 1/2000 |
| GB | 2052968 A | * | 2/1981 |
| GB | 2280344 A | * | 1/1995 |
| NL | 1002746 C | * | 3/1996 |

* cited by examiner

FLOWER POT

CROSS REFERENCE TO RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC

Not Applicable

BACKGROUND OF THE INVENTION (1) Field of the Invention

This invention generally relates to a flowerpot, and, more particularly, to a flowerpot made of a deep-drawn plastic for a hanging basket.

(2) Description of Related Art

Flowerpots made of plastic are very widespread; injection-molded plastic pots offer a relatively high degree of freedom in the design of the pot and permit the insertion of webs, reinforcing ribs, branches in walls and the like. The design freedom is [determined] mainly by the requirement of unmoldability of the pot from injection mold and by minimum wall thicknesses for the flow paths in injection molding. When the injection molding material must be injected from an injection point at the bottom through thin-walled areas up to the edge of the pot, "freezing" in the form of solidification of material threatens to occur in the wall area.

Alternatively, there are also flowerpots and other plant pots made of plastic in a deep-drawn form, since attempts to control the wall thickness distribution of such a product have been successful, and in particular it has become possible to predetermine the wall thicknesses in the area of the conical pot wall; this would pose problems in the injection molding process. It is also of interest that the deep-drawn pot retains its greatest wall thickness at the upper edge, which is normally designed like a flange with a turned-down collar. A corresponding rigidity is also demanded there. This edge is formed by a ring-shaped insert of a plastic film which is to be deep-drawn and is brought in contact with a hollow mold in the inside area by using a mold and by applying an excess pressure on the inside and/or a vacuum on the outside.

The ring-shaped insert, however, necessitates a continuous edge contour without any interruptions or discontinuities. This edge contour is advantageously provided in flowerpots intended for hanging baskets or similar hanging use and in which a hanger having several strands, preferably three strands, is clipped to the edge of the pot by hook clamps. The hook clamps are thereby in a predetermined immovable position. Instead they may migrate along the edge and be displaced on the whole on one side of the edge of the pot, thus causing it to tip over. In the case of injection-molded flowerpots, a fixation of position would be easily achieved through intermediate webs or ribs beneath the edge, some of which are provided anyway, or by shaping and special contouring of the edge, which would be difficult or impossible to achieve with deep-drawn products.

BRIEF SUMMARY OF THE INVENTION

The object of this invention is to design a flowerpot produced by the deep-drawing method so that despite the particular design conditions, which are determined by the process technology, fixation of the seating of the hook clamps is possible, a good transfer of hanging loads between the pot clamps and the hook clamps is achieved, and an attractive shape that is easy to handle is obtained.

According to this invention, this object is achieved with a flowerpot according to the preamble of Claim 1 with the characterizing features of Claim 1.

It has been found that the deep-drawing process also allows an embodiment of the critical pot edge when narrowed zones are provided and are incorporated on the inside toward the wall of the pot. It is self-evident that such a change has an extensive influence on the working process in deep drawing and also the hollow shape for deep drawing as well as the design of the pot. The narrowed zones in the course of the edge essentially create a predetermined seating for the clamps, which can be removed from this seating only by being widened and thus only after overcoming an elastic resistance. The narrowed zones also prevent great widening and lever ratios on the clamps and corresponding mechanical loads accordingly. In addition, the narrowed zones may also be designed so that they do not develop into the broader edge areas with fluid transitional areas but instead develop abruptly and at an angle so that the transitions also provide stop functions for the hook clamps.

The narrowed zones in the edge are preferably connected with a step-like design of the transitional area between the edge of the pot and the wall of the pot, so that even in this area the wall continues from the edge into the wall of the pot, and due to the particular spatial design, the result is a stiffening, which is quite advantageous for the flow of force toward the seating of the hook clamps.

The height of the steps is expediently designed so that the clamps used with the hangers do not have any significant play in movement. Thus, even if the pots are struck or pressed, the hook clamps do not experience any critical movement or spreading that might endanger the hold with the pot, and instead the step forms a step bottom holding the hook clamps in position in the vertical direction.

The step shape is also dimensioned scantily in width with respect to the widest hook clamps provided, so that they fit into the step shape with only a small play and do not tend to become twisted or unhooked even under impact or compressive loads.

BRIEF DESCRIPTION OF THE SEVERAL VIEWS OF THE DRAWING(S)

Figure 5:
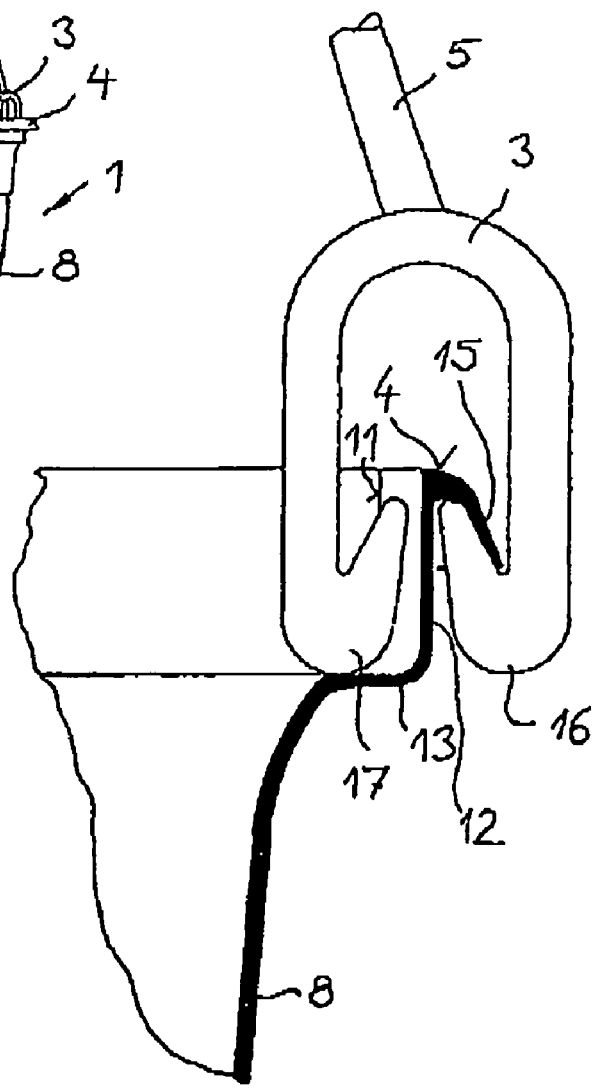
Figure 2:
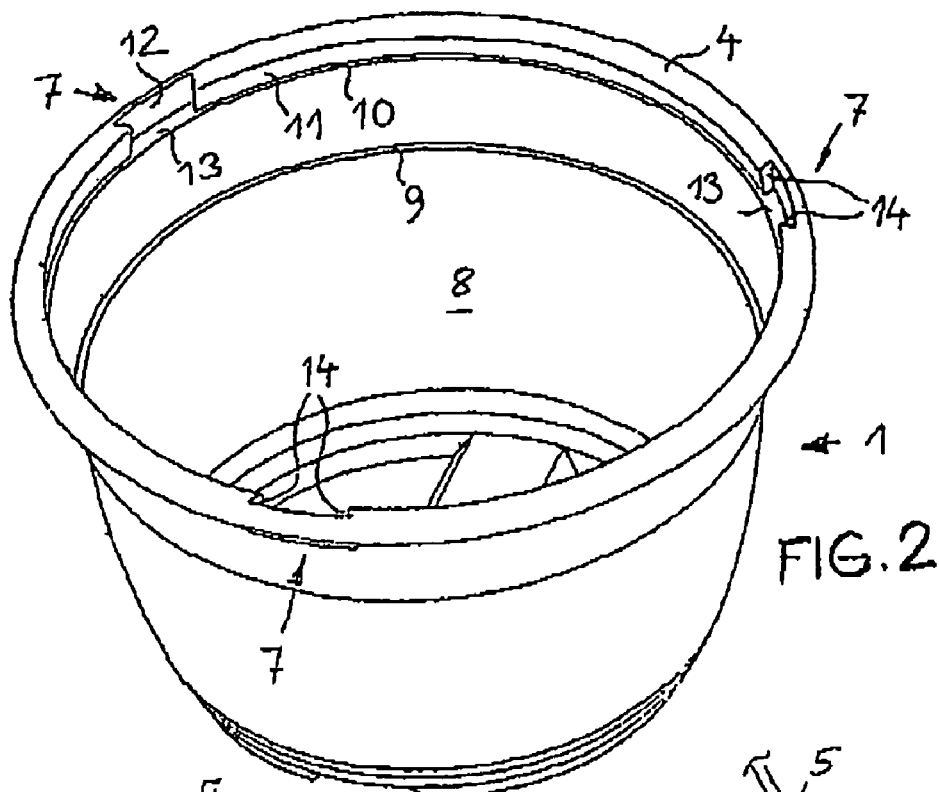
Figure 3:
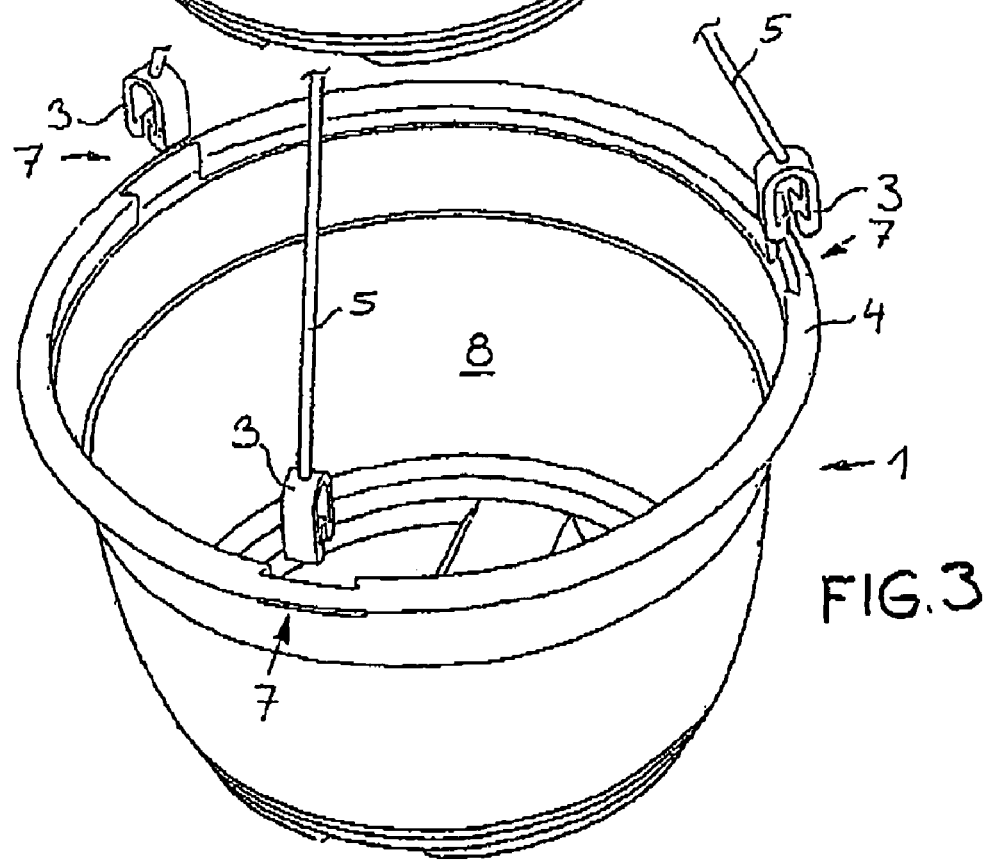
Figure 4:
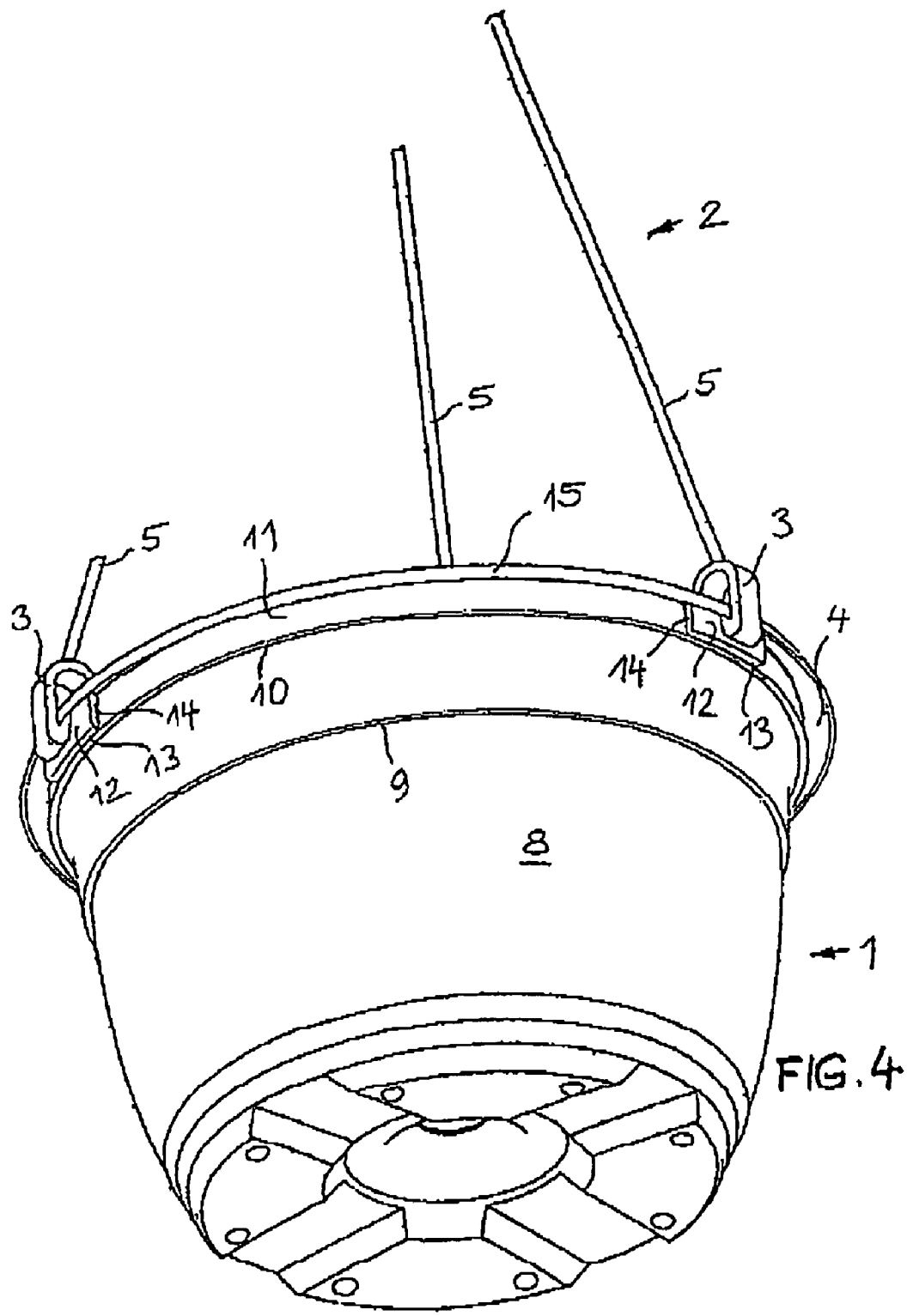

An exemplary embodiment of this invention is illustrated in the drawing and is described in greater detail below. In the drawings:

FIG. 1 shows a side view of a hanging basket consisting of a flowerpot as a deep-drawn part and a hanger, FIG. 2 shows a view of the flowerpot according to FIG. 1 as seen obliquely from above, FIG. 3 shows a view according to FIG. 2 with the hook clamps of a hanger depicted as suspended above the pot, FIG. 4 shows a view of the flowerpot obliquely from beneath with the hook clamps attached, and FIG. 5 shows an enlarged sectional view through the edge of the flowerpot at the seat of a hook clamp.

DETAILED DESCRIPTION OF THE INVENTION

A flowerpot 1 according to this invention is designed as a deep-drawn part and is connected to a hanger 2 as an injection-molded part. Both parts are made of plastic. The hanger 2 is provided with hook clamps 3, which are to be connected in an engaged fashion to an upper pot edge 4 of the pot 1. The hanger 2 also has three strands 5 which converge at a hook 6 at the top, by which the pot 1 and the hanger 2 are to be hung as a hanging basket.

The hanger 2 in its injection-molded form is only one known example of an embodiment to be found in detailed variants in practice. The hook clamps 3, which are responsible for the connection to the pot 1, are designed to have mirror symmetry in the present case, so that the pot can also be arranged so that it is rotated by 180° with two hooks, which simplifies handling. It is self-evident that the particular hook clamp may also be designed so that a hookless counterpart is opposite a hook part.

The design of the pot 1 is determined greatly by the shaping by deep drawing. In deep drawing, complex shapes such as ribs, branching of walls, etc., are out of the question. However, even when the shape is specified by a continuous closed wall, relationships between shaping, e.g., in indentations or protrusions, and wall thickness must be taken into account. Although a certain influence on the wall thickness distribution can be obtained by proceeding incrementally and using special unmolding tools before unmolding by applying vacuum from the outside and/or excess pressure from the inside, the relationships must nevertheless be considered as highly complex in any case.

A further restriction on shaping arises from the fact that the product is shaped from a flat material, which is usually to be defined by an edge in shaping. This edge forms the pot edge 4 in the present case, which is affected very little by deep drawing and therefore, which is definitely advantageous, is designed to be particularly stiff. However, it would at least be difficult to provide interruptions or discontinuities in the pot edge.

A deep-drawn pot of the type depicted here shaped from a flat plastic semifinished product of 1 to 1.8 mm thickness, here 1.45 mm has a wall thickness distribution between 0.8 mm at the pot edge 4 to approx. 0.5 mm at the bottom to less than 0.3 mm in the wall 8 as a result of the deep drawing operation.

A continuous pot edge in the form of a strip or profile to conform to the manufacturing process could not, however, achieve any defined seating or any defined fixation of the hook clamps 3 in the circumferential direction. This is true of a round pot of the type depicted here with respect to three hook clamps and/or also, e.g., with a rectangular or hexagonal pot. The hook clamps could easily migrate or slip along the edge and cause the pot to hang crookedly.

FIG. 2 shows a design of the pot edge 4 having three symmetrically distributed narrowed zones 7, which are suitable as the seating for the hook clamps.

These narrowed zones of the pot edge 4 are designed as part of the overall shell-type design of the deep-drawn part in that a region of an adjacent wall 8 runs essentially perpendicularly there over a short section except for narrow reinforcing ridges 9, 10.

Thus in the present case, a ring strip 11 of the wall 8 running between the top ridge 10 and the pot edge 4 is displaced outward to form an approximately vertical section 12, where the ridge 10 has a ridge-like broadened area 13. In the circumferential direction, the shell-like closed shape of the deep-drawn part is supplemented by end walls 14 which close the seat approximately at a right angle, in the present case even being extended beyond 90° and forming acute-angle connections.

Such a shaping of the pot can also be implemented in a deep-drawn pot because a closed edge strip remains at any rate in the outer area of the pot edge 4, the initially flat molding also finding a fixed hold on this edge strip in deep drawing. The shell shape of the deep-drawn part is preserved without requiring any branches or deformation downward and outward opposite the main direction of shaping that would be incompatible with the system.

The narrowed zones 7 are advantageous for the seating of the hook clamps which must be spread slightly accordingly when pushed onto them and which engage tightly on a vertical wall, namely the wall part 12, in the use position, thus serving to transfer the hanging forces. It is self-evident that the narrowed zones also facilitate engaging the clamps by hand.

The most important function of the narrowed zones and in particular also the end faces 14 on these narrowed zones, however, can be regarded as the fixation of the hook clamps in the circumferential direction. With at least approximately rectangular shaping of the end walls, especially of course with a shaping of the type described here which includes acute angles, it may be assumed that there is security against unintentional migration of the hook clamps 3 in the circumferential direction. Even with a "softer" shaping of the narrowed zones with inclined transitions, the hook clamps could in the normal case be expected to remain seated without being able to rule out slippage due to inadvertent pressure or impact.

As shown by the enlarged sectional diagram according to FIG. 5, the hook clamp 3 engages beneath the narrowed edge 4 tightly against the wall area 12 which continues in a stepwise pattern into the widened area 13 of the ridge 10 and then further into the remaining wall 8.

The edge 4 is still surrounded by a collar 15 shaped as a peripheral continuation of the edge 4. The load-bearing hook 16 of the hook part 3 also reaches around this collar 15 with an end area designed to be long accordingly and an interior area designed to be deep accordingly, so that the hook 16 is mainly in supporting contact beneath the edge 4.

In the symmetrical design of the hook clamps 3, a second hook 17 is opposite the hook 16 in a mirror image arrangement. The hook is supported in the engaged state of the hook clamps 3 on the widened area 13 and thus secures the hook clamps 3 vertically in the engaged position. This prevents an impact beneath the pot or pressure from above on the hanger 2 or a single hook clamp from resulting in spreading of the hook clamps and then displacement in the circumferential direction or even damage due to overspreading. The connection between the pot 1 and the hanger 2 thus at least has little or no play, which facilitates handling and improves the strength of the hanging basket.

It is self-evident that in an asymmetrical embodiment of the hook clamp, a counterpart to the hook 16 could be provided instead of the hook 17, this counterpart running downward at a slight distance from the section 12 and expediently also establishing a support on the broadened area 13.

The clamp engagement process is also clear from FIG. 5 in particular, in which the hook clamp bends, but the collar 15 and the adjacent area of the pot can definitely also yield. The hook clamp 3 is then pushed down so far that the hook 16 can reach above the collar 15, while the hook 17 presses on the wall 8 beneath the widened area 13. In a backward movement, the hook 16 comes to rest beneath the edge 4, so the hook 17 can recoil into its starting position in comparison with the hook 16 and is then above the widened area 13.

The end walls 14 on both sides of a narrowed zone 7 require a distance which provides the space for the hook clamps in question. In the present case the hook clamps are designed to be relatively narrow and have a considerable play of movement in the circumferential direction. It is self-evident that it may be advantageous to define the width of the hook clamps in order to achieve a limited play with a narrowed zone, which is adapted to be narrow in the circumferential direction, this then suppressing pivoting and tilting movements of the hook clamps in their seating.

The invention claimed is:

1. Flowerpot made of a deep-drawn plastic for a hanging basket, the flowerpot comprising:
    a deep-drawn plastic pot having an upper pot edge which is provided with a continuous and uniform contour on the outside;
    wherein the upper pot edge is provided with an arched contour on the outside;
    a hanger including multiple strands which are connected by hook clamps to the upper pot edge;
    wherein the upper pot edge has a plurality of narrowed zones symmetrically spaced-apart about an inside circumference of the upper pot edge and belonging to a wall that is connected at a bottom of the pot;
    wherein the upper pot edge is the uppermost surface of the pot and the narrowed zones are located in the uppermost surface of the pot;
    wherein the upper pot edge is narrower in a direction perpendicular to the wall at the narrowed zones than at portions of the upper pot edge circumferentially adjacent to the narrowed zones; and
    wherein each of the narrowed zones forms a seat for one of the hook clamps.

2. Flowerpot according to claim 1, wherein an intermediate step circumscribing an inside surface of the wall is located below the narrowed zones between the pot edge and the bottom and forms upward-facing widened areas at the narrowed zones and the widened areas form a portion of the seats for the hook clamps, and wherein the widened areas of the step are wider in a direction perpendicular to the wall at the narrowed zones than at portions of the step circumferentially adjacent to the narrowed zones.

3. Flowerpot according to claim 1, wherein the narrowed zones are dimensioned in the circumferential direction to just fit the widest hook clamps that are provided.

4. Flowerpot according to claim 1, wherein the hook clamps engage tightly beneath the pot edge against an inside surface of the wall at the narrowed zones.

5. Flowerpot according to claim 1, wherein a periphery of the pot edge has a down turned collar at least in the area of the narrowed zones and the hook clamps reach around the collar to be in supporting contact beneath the pot edge.

6. Flowerpot according to claim 5, wherein the collar surrounds the pot edge (4) entirely and forms the continuous peripheral contour of the pot edge.

7. Flowerpot according to claim 1 wherein the flowerpot is drawn from a flat starting material with a thickness between 1 mm and 1.8 mm and has a wall thickness of less than 0.3 mm in some areas.

8. Flowerpot according to claim 1, wherein the narrowed zones fix the hook clamps against migration about the circumference of the upper pot edge.

9. Flowerpot according to claim 1, wherein the upper pot edge is substantially circular on the outside.

10. Flowerpot according to claim 2, wherein each of the widened areas is bordered on both sides in the circumferential direction by end walls that form approximately a right angle with the wall.

11. Flowerpot according to claim 2, wherein the narrowed zones are dimensioned in the circumferential direction to just fit the widest hook clamps that are provided.

12. Flowerpot according to claim 2, wherein the hook clamps engage tightly beneath the pot edge against an inside surface of the wall at the narrowed zones.

13. Flowerpot according claim 2, wherein a periphery of the pot edge has a down turned collar at least in the area of the narrowed zones and the hook clamps reach around the collar to be in supporting contact beneath the pot edge.

14. Flowerpot according to claim 13, wherein the collar surrounds the pot edge entirely and forms the continuous peripheral contour of the pot edge.

15. Flowerpot according to claim 2, wherein the flowerpot is drawn from a flat starting material with a thickness between 1 mm and 1.8 mm and has a wall thickness of less than 0.3 mm in some areas.

16. Flowerpot according to claim 2, wherein the hook clamps engage the widened areas.

17. Flowerpot according to claim 2 or 10, wherein the intermediate step has a height which determines the seat of the hook clamp in an engaged position.

18. Flowerpot made of a deep-drawn plastic for a hanging basket, the flowerpot comprising:
    a deep-drawn plastic pot having an upper pot edge which is provided with a continuous and uniform contour on the outside;
    wherein the upper pot edge is provided with an arched contour on the outside;
    a hanger including multiple strands which are connected by hook clamps to the upper pot edge;
    wherein the upper pot edge has a plurality of narrowed zones symmetrically spaced-apart about an inside circumference of the upper pot edge and belonging to a wall that is connected at a bottom of the pot;
    wherein the upper pot edge is the uppermost surface of the pot and the narrowed zones are located in the uppermost surface of the pot;
    wherein the upper pot edge is narrower in a direction perpendicular to the wall at the narrowed zones than at portions of the upper pot edge circumferentially adjacent to the narrowed zones;
    wherein an intermediate step circumscribing an inside surface of the wall is located below the narrowed zones between the pot edge and the bottom and forms upward-facing widened areas at the narrowed zones;
    wherein the widened areas are engaged by the hook clamp;
    wherein the widened areas of the step are wider in a direction perpendicular to the wall at the narrowed zones than at portions of the step circumferentially adjacent to the narrowed zones;
    wherein a periphery of the pot edge has a down turned collar at least in the area of the narrowed zones and the hook clamps reach around the collar at the narrowed zones to be in supporting contact beneath the pot edge; and
    wherein each of the narrowed zones forms a seat for one of the hook clamps.

19. Flowerpot according to claim 18, wherein the upper pot edge is substantially circular on the outside.

* * * * *

UNITED STATES PATENT AND TRADEMARK OFFICE
CERTIFICATE OF CORRECTION

PATENT NO. : 7,610,717 B2  Page 1 of 1
APPLICATION NO. : 10/487650
DATED : November 3, 2009
INVENTOR(S) : Lüken et al.

It is certified that error appears in the above-identified patent and that said Letters Patent is hereby corrected as shown below:

On the Title Page
Item (73) the Assignee on the issued patent is listed as Gebr. Poeppelmann Kunkstoffwerk-Wekzeugbau, Lohne (DE). The correct Assignee is Poeppelmann Holding GmbH & Co. KG, Lohne (DE).

Signed and Sealed this

Twenty-first Day of December, 2010

David J. Kappos
*Director of the United States Patent and Trademark Office*